(12) United States Patent
Galicia et al.

(10) Patent No.: US 11,281,508 B2
(45) Date of Patent: Mar. 22, 2022

(54) SYSTEMS AND METHODS FOR PROVIDING LOW MEMORY KILLER PROTECTION TO NON-SYSTEM APPLICATIONS

(71) Applicant: VeriFone, Inc., San Jose, CA (US)

(72) Inventors: Joshua David Galicia, Cary, IL (US); Nicholas James Versino, Lake Zurich, IL (US); Christopher Scott Gremo, Mchenry, IL (US); Robert Ferguson, Tujunga, CA (US)

(73) Assignee: VERIFONE, INC., Wilmington, DE (US)

( * ) Notice: Subject to any disclaimer, the term of this patent is extended or adjusted under 35 U.S.C. 154(b) by 356 days.

(21) Appl. No.: 16/362,292

(22) Filed: Mar. 22, 2019

(65) Prior Publication Data

US 2020/0301833 A1 Sep. 24, 2020

(51) Int. Cl.
*G06F 3/00* (2006.01)
*G06F 9/54* (2006.01)
*G06F 8/20* (2018.01)

(52) U.S. Cl.
CPC .............. *G06F 9/542* (2013.01); *G06F 8/20* (2013.01)

(58) Field of Classification Search
CPC .................................. G06F 8/20; G06F 9/542
USPC ......................................................... 719/310
See application file for complete search history.

(56) References Cited

U.S. PATENT DOCUMENTS

| | | | | |
|---|---|---|---|---|
| 5,815,702 A | * | 9/1998 | Kannan | G06F 9/542 710/260 |
| 9,891,999 B2 | * | 2/2018 | Gu | G09B 19/0038 |
| 2009/0113444 A1 | * | 4/2009 | Hackborn | G06F 11/1438 719/312 |
| 2013/0332942 A1 | | 12/2013 | Ramesh et al. | |
| 2014/0075567 A1 | * | 3/2014 | Raleigh | H04L 12/14 726/26 |
| 2014/0143791 A1 | | 5/2014 | Mark et al. | |

(Continued)

FOREIGN PATENT DOCUMENTS

CN 108804207 11/2018

OTHER PUBLICATIONS

Erik Derr, Understanding and Assessing Security on Android via Static Code Analysis. (Year: 2017).*

(Continued)

*Primary Examiner* — Lechi Truong

(74) *Attorney, Agent, or Firm* — Bond, Schoeneck & King, PLLC

(57) ABSTRACT

Systems and methods for low memory killer protection are disclosed. According to one embodiment, in an information processing apparatus comprising at least one computer processor and executing an operating system including a LMK subsystem, a method for providing low memory killer (LMK) protection may include: (1) a non-system application embedded with a SDK initiating a foreground service at the beginning of a use case session; (2) the non-system application causing the foreground service to create an ongoing notification with the operating system, wherein the ongoing notification causes the non-system application to have no lower than a perceptible LMK status during the use case session; (3) the non-system application completing the use case session; and (4) the non-system application causing the foreground service to remove the ongoing notification.

13 Claims, 4 Drawing Sheets

(56) References Cited

U.S. PATENT DOCUMENTS

| | | | | |
|---|---|---|---|---|
| 2015/0074407 A1* | 3/2015 | Palmeri | ............... | H04L 63/0823 |
| | | | | 713/171 |
| 2016/0149958 A1* | 5/2016 | Singh | .................... | H04L 63/205 |
| | | | | 726/1 |
| 2016/0371124 A1* | 12/2016 | Kim | .................... | G06F 9/45558 |
| 2018/0329748 A1* | 11/2018 | Sankarram | ............ | G06F 9/5016 |
| 2020/0028961 A1* | 1/2020 | Wang | .................... | G06F 3/0481 |
| 2021/0026688 A1* | 1/2021 | Cheng | .................... | G06F 9/505 |

OTHER PUBLICATIONS

Cong Li, Optimizing Low Memory Killers for Mobile Devices Using Reinforcement Learning. (Year: 2017).*

Matthias Lange, L4Android: A Generic Operating System Framework for Secure Smartphones. (Year: 2011).*

International Search Report, dated Jun. 12, 2020, from corresponding International Application No. PCT/US2020/023521.

Written Opinion of the International Searching Authority, dated Jun. 12, 2020, from corresponding International Application No. PCT/US2020/023521.

* cited by examiner

| Application | LMK Level w/ POS in FG | LMK Level w/ Payment App in FG | Comments |
|---|---|---|---|
| POS | FOREGROUND | PREVIOUS | Drops to previous as expected when leaving the foreground. |
| Payment Service | VISIBLE | PREVIOUS | Drops to previous as this service is bound to the POS application and inherits some protection from it. |
| Peripheral Service | PERSISTENT | PERSISTENT | Always protected from LMK, no concern. |
| Payment Application | PERSISTENT | PERSISTENT | Always protected from LMK, no concern. |
| Host Service | PERCEPTIBLE | PERCEPTIBLE | Always bound to persistent payment application, no concern even in quick refund case where the payment application never gains foreground. |
| CRS | CACHED | PERCEPTIBLE | Raises to PERCEPTIBLE when bound to foreground payment application. |

FIGURE 3

| Application | LMK Level w/ POS in FG | LMK Level w/ Payment App in FG | Comments |
|---|---|---|---|
| POS | FOREGROUND | PERCEPTIBLE | Only drops to PERCEPTIBLE because the of the PSDK-created foreground service and payment session ongoing notification. |
| Payment Service | VISIBLE | PERCEPTIBLE | Only drops to perceptible as this service is bound to the POS application and inherits some protection from it. |
| Peripheral Service | PERSISTENT | PERSISTENT | Always protected from LMK, no concern. |
| Payment Application | PERSISTENT | PERSISTENT | Always protected from LMK, no concern. |
| Host Service | PERCEPTIBLE | PERCEPTIBLE | Always bound to persistent payment application, no concern even in quick refund case where the payment application never gains foreground. |
| CRS | CACHED | PERCEPTIBLE | Raises to PERCEPTIBLE when bound to foreground payment application. |

FIGURE 4

SYSTEMS AND METHODS FOR PROVIDING LOW MEMORY KILLER PROTECTION TO NON-SYSTEM APPLICATIONS

BACKGROUND OF THE INVENTION

1. Field of the Invention

The present disclosure relates generally to systems and methods for providing low memory killer protection to non-system applications.

2. Description of the Related Art

The Android mobile operating system includes a Low Memory Killer (LMK) subsystem, which is a process that monitors the memory state. When the LMK subsystem senses high memory pressure, it may kill the least essential processes to keep system performance at acceptable levels.

Android includes multiple levels of LMK protection, depending on the application's operational status. For example, when an application is in the foreground, it is granted FOREGROUND LMK status, as it is in primary use. When it leaves the foreground, it is granted PREVIOUS LMK status, and may move to CACHED LMK status. If the application is in the background and can be perceived by a user (e.g., music playing in the background), it may be granted PERCEPTIBLE LMK status. If an application is not in the foreground, but is still visible to the user (e.g., by transparency), the application may be granted VISIBLE status. Applications having a CACHED LMK status are expendable, and applications having the PERSISTENT LMK status are considered to be immune to LMK.

When a group of applications work together to accomplish a use case, the LMK subsystem is unaware of the critical relationship between the group of applications, and may kill one or more of the applications during the use case, therefore terminating the use case. An example of such a use case is a payment transaction, where there may be several separate Android applications involved in accomplishing the payment transaction. If any of those applications is killed before the transaction is complete, the transaction cannot be completed.

While many of the applications in a group may be under the control of the device software platform ("system applications"), which may be designed with special mechanisms to protect certain applications, this is not the case for every application as different applications may be supplied by different entities. For example, for a point-of-sale device, a point-of-sale application may be provided by a merchant or an acquirer, and would not be protected as system applications. Adding such protection on a case-by-case basis is difficult as it requires granting privileges to the point-of-sale application that the non-system normally are not granted.

SUMMARY OF THE INVENTION

Systems and methods for providing low memory killer protection are disclosed. According to one embodiment, in an information processing apparatus comprising at least one computer processor and executing an operating system including a LMK subsystem, a method for providing low memory killer (LMK) protection may include: (1) a non-system application embedded with a SDK initiating a foreground service at the beginning of a use case session; (2) the non-system application causing the foreground service to create an ongoing notification with the operating system, wherein the ongoing notification causes the non-system application to have no lower than a perceptible LMK status during the use case session; (3) the non-system application completing the use case session; and (4) the non-system application causing the foreground service to remove the ongoing notification.

In one embodiment, the SDK may be embedded into the non-system application by including an AAR file in the non-system application.

In one embodiment, the use case may be executed by the non-system application and at least one system application.

In one embodiment, wherein the operating system may be the Android mobile operating system.

In one embodiment, the non-system application may perform an action that brings a system application to the foreground.

According to another embodiment, an electronic device providing low memory killer (LMK) protection to non-system applications may include at least one computer processor, an operating system executed by the at least one computer processor, the operating system including a LMK subsystem, and a memory storing at least one non-system application embedded with a SDK. The non-system application may initiate a foreground service at the beginning of a use case session, may cause the foreground service to create an ongoing notification with the operating system, wherein the ongoing notification causes the non-system application to have no lower than a perceptible LMK status during the use case session, may complete the use case session, and may cause foreground service to remove the ongoing notification.

In one embodiment, the SDK may be embedded into the non-system application by including an AAR file in the non-system application.

In one embodiment, the memory may include a system application, and the use case is executed by the non-system application and the system application.

In one embodiment, the operating system is the Android mobile operating system.

In one embodiment, the electronic device may be a point of sale device.

In one embodiment, the non-system application may perform an action that brings a system application to the foreground.

BRIEF DESCRIPTION OF THE DRAWINGS

For a more complete understanding of the present invention, the objects and advantages thereof, reference is now made to the following descriptions taken in connection with the accompanying drawings in which:

FIG. 3 is an illustrative table depicting the LMK status of applications in the absence of LMK protection;

FIG. 4 is an illustrative table depicting the LMK status of applications with LMK protection enabled according to one embodiment.

DETAILED DESCRIPTION OF PREFERRED EMBODIMENTS

Embodiments are directed to systems and methods for low memory killer protection. Embodiments protect non-system applications that interact with system applications to prevent a use case from being killed, or terminated, by the LMK subsystem, during execution of the use case.

As used herein, a "use case" is a task that is performed by a group of separate applications. Some of the applications may be system applications, and others may be non-system applications that may be susceptible to termination or killing by the LMK subsystem.

Although embodiments are described in the context of electronic devices running the Android mobile operating system, it should be recognized that embodiments may have applicability with other operating systems.

In embodiments, a Software Development Kit (SDK) that is embedded in a non-system application may perform the following. First, at the start of a use case, a non-system application may initiate a "session" using a SDK. The session may be required in order for the non-system application to initiate a transaction with system applications.

Upon the starting of a session, a foreground service, which may manage sessions with non-system applications, may be automatically created.

In one embodiment, the SDK may include APIs, such as startSession( ) and endSession, which start and end the session, respectively. The non-system application uses these APIs, which may start and stop the foreground service.

The foreground service may then create an ongoing (i.e., persistent) notification indicating that the use case session is in progress.

The creation of the ongoing notification causes the non-system application that created the notification via the foreground service to have a minimum of PERCEPTIBLE LMK protection for the duration of the notification, even when it leaves the foreground and thereby relinquishing its FOREGROUND level protection. This avoids the non-system application dropping to a PREVIOUS/CACHED protection level when it passes control of the use case to another system application, thus putting the system application in the foreground while it moves to the background.

In one embodiment, only certain non-system applications may require LMK protection. For example, in the payment use case example, applications that integrate with the payment application and perform transactions need the LMK protection.

At the conclusion of the use case session, the foreground service may remove the ongoing notification. In one embodiment, the non-system application may control the timing of the closing of sessions. For example, sessions may be closed after a single transaction, after multiple transactions, or as necessary and/or desired.

Figure 1:
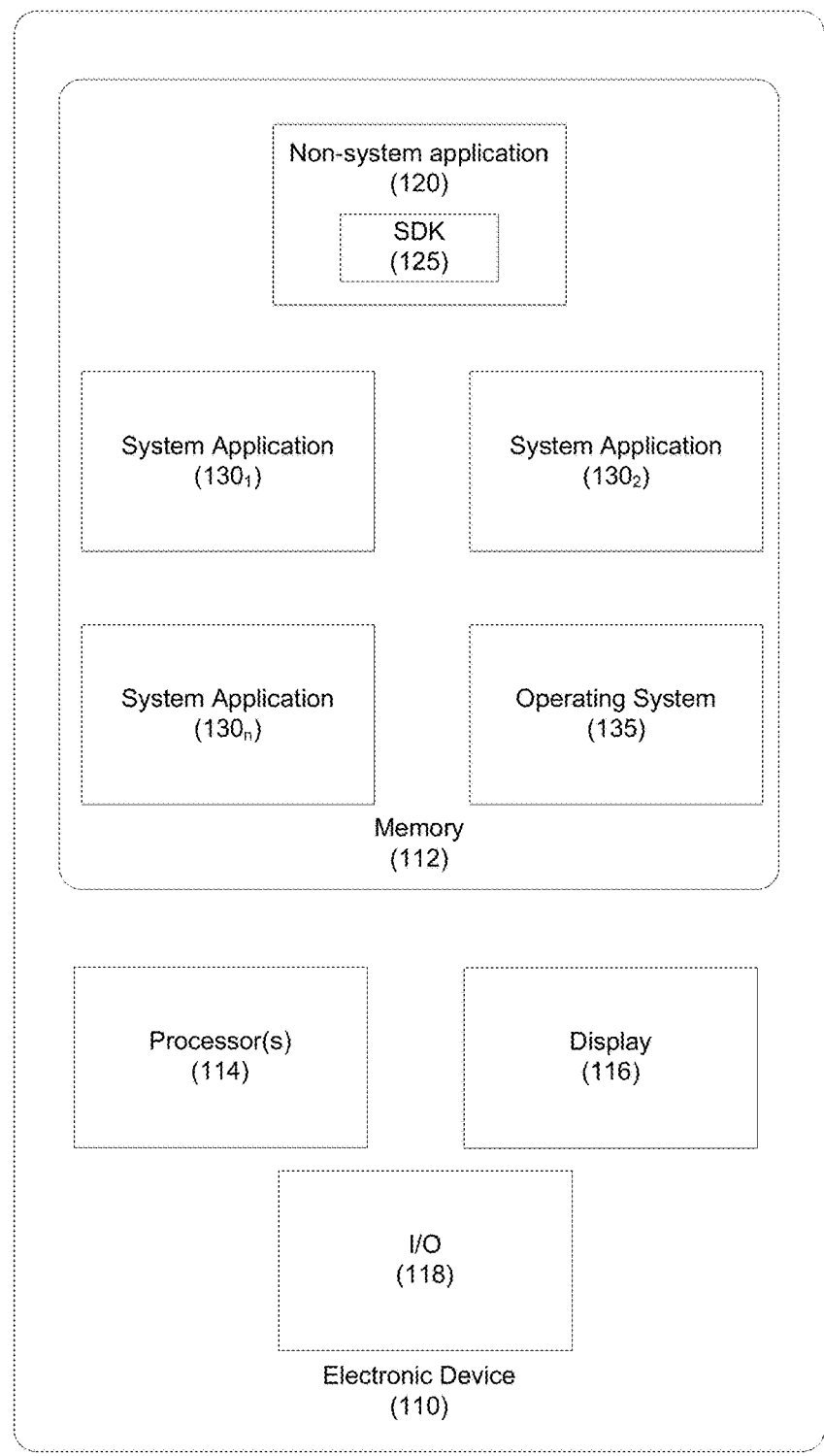
FIG. 1 depicts a system for providing low memory killer protection according to one embodiment.

Referring to FIG. 1, an electronic device including LMK protection is provided according to one embodiment. Electronic device 110 may be any suitable electronic device that provides low memory kill services. Examples of electronic devices 110 include devices executing the Android mobile operating system.

Electronic device 110 may include memory 112, processor(s) 114, display 116, and input/output (I/O) 118. Any suitable components may be used as is necessary and/or desired.

Memory 112 may host operating system 135, such as the Android mobile operating system. Operating system 135 may include daemons, services, and kernels, such as the low memory kill subsystem (not shown).

Memory 112 may further host non-system application 120, and system application(s) $130_1$, $130_2$, . . . $130_n$. Non-system application 120 may include SDK 125. SDK 125 may be embedded within non-system application and may include instructions to start a foreground service at the start of a use case session; to have the foreground service create an ongoing notification during the use case session; and to have the foreground service remove the ongoing notification when the use case is complete.

In one embodiment, the SDK may be embedded in the non-system application by including a file (e.g., an AAR file) into the non-system application. The file may enable the application to access the functions of the SDK.

In one embodiment, the AAR file may be included in the developer's application project (e.g., within the Android Studio IDE or another IDE), and may then be accessible by virtue of the AAR being included as a library in the project.

Figure 2:
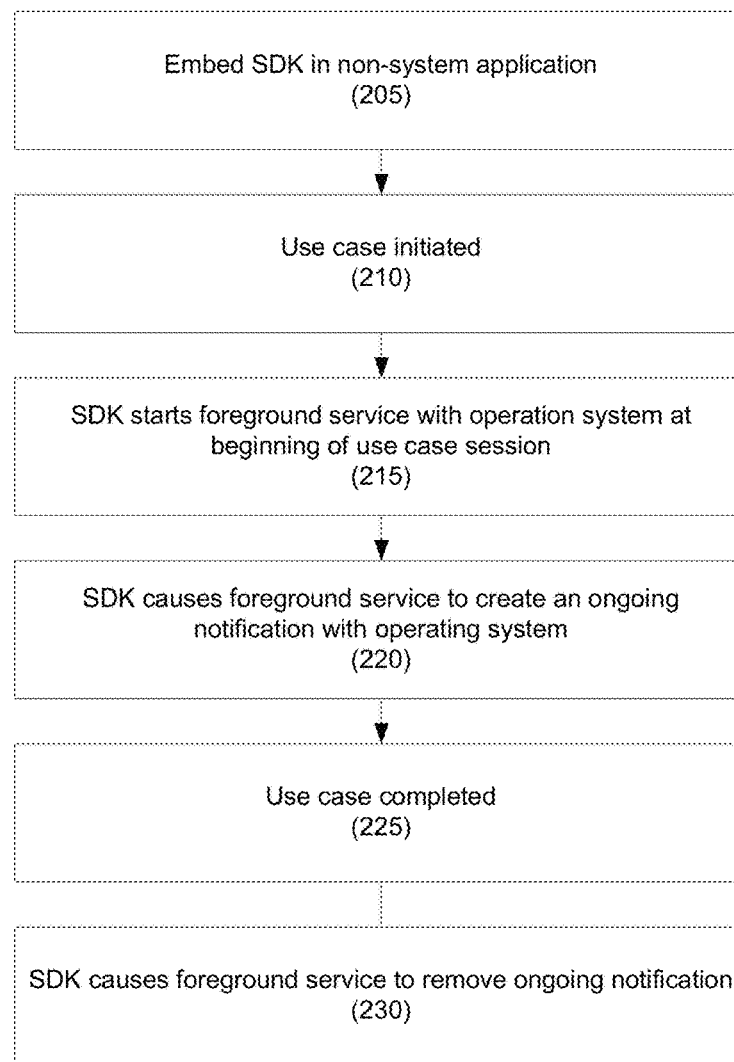
FIG. 2 depicts a method for providing low memory killer protection according to one embodiment.

Referring to FIG. 2, a method of providing low memory killer protection is provided according to one embodiment. In step 205, a SDK may be embedded in a non-system application. In one embodiment, the SDK may include instructions to start a foreground service at the start of a use case session; to have the foreground service create an ongoing notification during the use case session; and to have the foreground service remove the ongoing notification when the use case is complete.

In step 210, a use case may be initiated using, for example, a non-system application.

In step 215, at the beginning of the use case, the SDK starts a foreground service with the operating system.

In step 220, the SDK causes the foreground service to create an ongoing notification with the operating system.

In one embodiment, the non-system application may have a session, and may still be in the foreground. In this case, the non-system application retains the stronger foreground protection. When the non-system application leaves the foreground during an active session (e.g., the foreground service and notification are active), the non-system application may receive perceptible protection instead of dropping further to previous or cached status.

In step 225, the non-system application, and system applications, complete a use case.

In step 230 at the completion of the use case, the SDK causes the foreground service to remove the ongoing notification.

An example of the LMK protection states for non-system applications and system applications is provided in FIGS. 3 and 4. It should be noted that this example is illustrative only and does not limit the scope of this disclosure.

In the example, a use case may include several applications, including a point-of-sale (POS) application, which is a non-system application that includes the SDK. The use case may further execute system applications, including Payment Service, Peripheral Service, Payment Application, Host Service, and CRS.

FIG. 3 illustrates the LMK status of the application in the absence of LMK protection. For example, the POS application will start with a FOREGROUND LMK status, but when the payment application moves to the FOREGROUND, the POS application's LMK status drops to PREVIOUS, making is susceptible to termination by the LMK subsystem. Because the payment service application is bound to the POS application, it also drops to a PREVIOUS LMK status.

FIG. 4 illustrates the LMK status of the applications with LMK protection enabled. For example, the POS application will again start with a FOREGROUND LMK status, but when the payment application moves to the FOREGROUND, the POS application's LMK status only drops to PERCEPTIBLE. This is because of the foreground service and the ongoing notification. Thus, the POS application is not susceptible to LMK termination.

It will be appreciated by persons skilled in the art that the present invention is not limited by what has been particularly shown and described hereinabove. Rather the scope of the present invention includes both combinations and sub-combinations of features described hereinabove and variations and modifications thereof which are not in the prior art. It should further be recognized that these embodiments are not exclusive to each other.

It will be readily understood by those persons skilled in the art that the embodiments disclosed here are susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for providing low memory killer (LMK) protection, comprising: in an information processing apparatus comprising at least one computer processor and executing an operating system including a LMK subsystem: a non-system application embedded with a Software Development Kit (SDK) initiating a foreground service at a beginning of a use case session: the non-system application causing the foreground service to create an ongoing notification with the operating system that persists during the use case session, wherein the ongoing notification causes the non-system application to have no lower than a perceptible LMK status during the use case session, and wherein the ongoing notification indicates that the use case session is in progress; the non-system application completing the use case session with the SDK; and the non-system application causing the foreground service to remove the ongoing notification;
    wherein the SDK is embedded into the non-system application by including an Android Archive (AAR) file in the non-system application,
    wherein the use case session comprises a task that is executed by the non-system application and at least one system application.

2. The method of claim 1, wherein the operating system is an Android mobile operating system.

3. The method of claim 1, further comprising: the non-system application performing an action that brings a system application to the foreground and causes the non-system application to leave the foreground.

4. The method of claim 3, wherein the ongoing notification and the perceptible LMK status continue after the non-system application leaves the foreground.

5. The method of claim 1, wherein the foreground service manages the use case session with the non-system application.

6. The method of claim 1, wherein the use case session involves a payment transaction.

7. An electronic device providing low memory killer (LMK) protection to a non-system application, comprising: at least one computer processor; an operating system executed by the at least one computer processor, the operating system including a LMK subsystem; a memory storing at least one non-system application embedded with a Software Development Kit (SDK); wherein: the non-system application initiates a foreground service, at a beginning of a use case session; the non-system application causes the foreground service to create an ongoing notification with the operating system that persists during the use case session, wherein the ongoing notification causes the non-system application to have no lower than a perceptible LMK status during the use case session, and wherein the ongoing notification indicates that the use case session is in progress; the non-system application completes the use case session with the SDK; and the non-system application causes the foreground service to remove the ongoing notification;
    wherein the SDK is embedded into the non-system application by including an Android Archive (AAR) file in the non-system application,
    wherein the use case session comprises a task that is executed by the non-system application and at least one system application.

8. The system of claim 7, wherein the operating system is an Android mobile operating system.

9. The system of claim 7, wherein the electronic device comprises a point of sale device.

10. The system of claim 7, wherein the non-system application further performs an action that brings a system application to the foreground and causes the non-system application to leave the foreground.

11. The system of claim 10, wherein the ongoing notification and the perceptible LMK status continue after the non-system application leaves the foreground.

12. The system of claim 7, wherein the foreground service manages the use case session with the non-system application.

13. The system of claim 7, wherein the use case session involves a payment transaction.

* * * * *